Oct. 16, 1928.

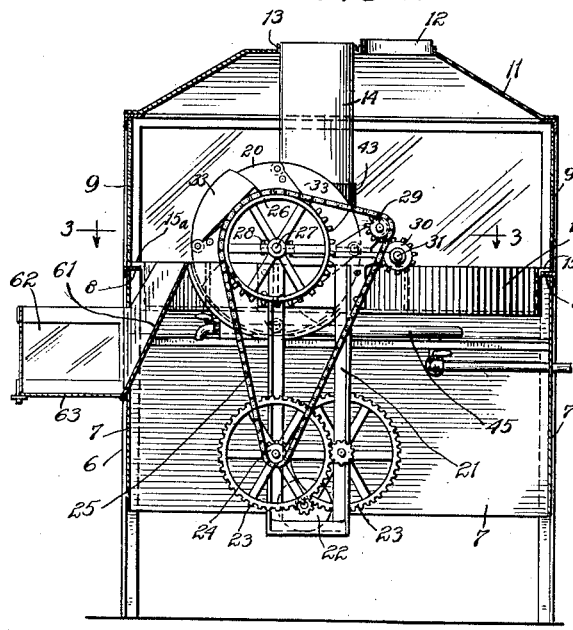

E. A. DENZ ET AL 1,688,315

FRYING MACHINE

Filed Dec. 6, 1924

Inventors
Emil A. Denz
John E. Titus
by John E. Titus Atty

Patented Oct. 16, 1928.

1,688,315

UNITED STATES PATENT OFFICE.

EMIL A. DENZ AND JOHN E. TITUS, OF CHICAGO, ILLINOIS.

FRYING MACHINE.

Application filed December 6, 1924. Serial No. 754,322.

This invention relates to improvements in frying machines, or, more broadly, to machines in which the material to be treated is dropped into a liquid medium, retained in the liquid for a predetermined length of time, and then removed, automatically. The improvements more particularly relate to machines in which the material to be treated is dropped into the liquid or cooking oil, and the oil is circulated throughout the containing vessel to carry the material along and move it from the point at which the material is dropped to a second point where the material is removed, so that the total operation may be carried on in a continuous manner.

The objects of the invention are: To provide a machine in which the liquid circulation is more uniform at each cross-section of the channel, less subject to eddies and quiet spots, to eliminate separated surface and bottom currents, in order that the material may be carried in a very even and positive manner; to provide a machine which may be small in size relative to its capacity; to provide a simple and effective means for removing material floating at the bottom of the liquid as well as the material floating at the top of the liquid; to provide a suitably vented enclosure over and surrounding the cooking oil vessel to retain the heat in order that high temperatures may be maintained; to provide a hopper contained within the said enclosure and opening through it so that the material will be preheated before being dropped into the liquid, to drive out a portion of the moisture to preserve the units of heat, avoid waste of the cooking oil, and improve the product by quickly searing the surface of the material to be cooked and thus retain the food elements therein; to provide a convenient receptacle to receive the finished material from which the material may be removed without being broken or touched by hands; and to provide a machine which is simple in its construction and easily assembled. Further objects and advantages will become more apparent from the following description with reference to the accompanying drawings in which:

Fig. 1 is a side elevation of a machine embodying our invention.

Fig. 2 is a sectional elevation taken on the line 2—2 of Fig. 1.

Fig. 3 is a section taken substantially on the line 3—3 of Fig. 2.

Figure 4:
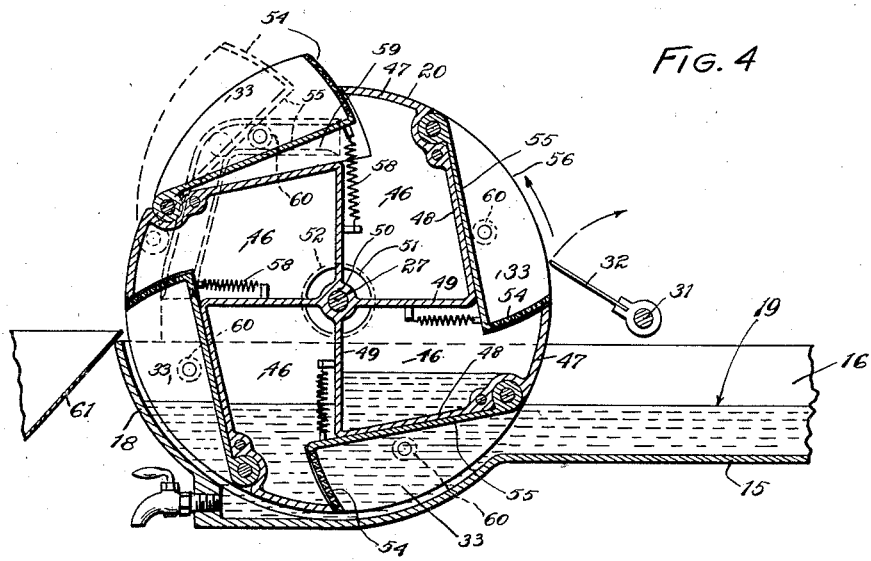
Fig. 4 is a detailed sectional view of the wheel element taken on the line 4—4 of Fig. 3.
Figure 5:
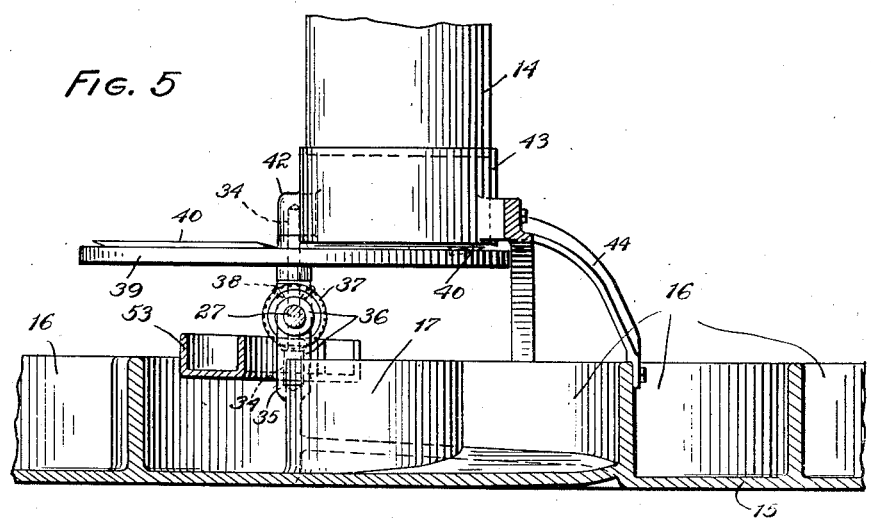
Fig. 5 is a detailed view of the slicing mechanism and adjacent parts taken on the line 5—5 of Fig. 3.

The frame on cabinet 6 is a substantially square structure with metal panels 7 around the lower portion, one or more of which panels may be divided into sliding sections to afford access to the interior. A ledge 8 is provided around the inside of the cabinet 6 at the top of the panels 7. The space above ledge 8 is enclosed with glass panels 9, one or more of which may be made up of sliding sections, as at 10, Fig. 3. The top covering 11 of the cabinet 6 is provided with a flue opening 12 and an opening 13 for the upper end of the circular glass hopper 14. The pan or cooking oil receptacle 15 is preferably made in a one piece casting and has lugs or projections 15ª adapted to rest on the ledge 8. In order that the pan 15 is divided by vertical walls into a substantially spiral shaped channel 16 having the inner end 17 and the outer end 18. In operation the channel 16 is filled with cooking oil to about the level of the line 19, Fig. 4, and the outer end 18 is deepened to accommodate the wheel element 20.

The frame 21 for the drive mechanism, hereinafter described, is bolted to the side of the pan 15 and carries the drive motor 22 supported in the lower part of the cabinet 6. The motor 22 is geared through the reduction gearing 23 to the sprocket pinion 24. The drive chain 25 passes around the sprocket 24 over the large sprocket wheel 26 which is fastened on the horizontal shaft 27 which has a bearing 28 in the frame 21, over the tightener sprocket 29 and behind the sprocket 30 which is carried on the stub shaft 31 which is also mounted in the frame 21. The sprocket 26 and 30 are proportioned four to one in size so that the wheel paddle 32, secured to the shaft 31, will cooperate with each one of the four hinged pockets 33 in the wheel element 20 and the arrangement of the drive chain 25 as described causes the shafts 27 and 31 to turn in the direction required.

A vertical shaft 34 is mounted in a step bearing 35. In the wall of the inner end 17 of the channel and extends up through the bearing member 36 which seats on a portion of the top of the channel wall and which provides a bearing for the inner end of the horizontal shaft 27. The vertical shaft 34 is driven at an increased rate of turning from the shaft 27 by the bevel gears 37 and 38, on the shafts 27 and 34 respectively.

The slicer disc 39 is carried by the vertical shaft 34 and is provided with the knives 40 set into the upper surface and rearward to the openings 41 in the disc 39. The end of the shaft 34 extends beyond the disc 39 and receives the step bearing 42 of the hopper bottom 43. The inner end of the hopper bottom 43 is thus supported by the shaft 34 and the hopper is further supported by the frame member 44 which is secured to the top edges of the channel walls of the pan 15. The hopper casting 43 is adapted to receive and support the cylindrical hopper 14 which is preferably made of glass tubing. A suitable heating element 45, such as a gas burner, is supported beneath the pan 15.

The wheel element 20 is mounted to rotate in a vertical plane and the lower portion is partially submerged in the cooking oil. The wheel 20 is hollow and is divided into four pockets or compartments 46 formed by the peripheral wall portion 47 which joins into the tangential wall 48 and the radial wall 49 which joins into the hub portion 50. When the outer portion of these compartments 46 is submerged in the oil, the oil will flow in and then, after the wheel rotates, the oil is trapped in the pockets and directed to the center of the wheel where it flows out through the openings 51 into the hollow hub 52 where the oil pours into the trough 53. The trough 53 is located above the channels and carries the oil over to the inner end 17 where the oil is poured back into the channels and again starts around the circuit.

The pockets or scoops 33 are hinged in the periphery of the wheel 20 and have perforated ledges or ends 54, outwardly sloping surfaces 55, and two side walls 56 and 57. Normally the hinged pockets 33 are held against the wheel by means of the springs 58 but when the pocket 33 is at the upper portion of the wheel it is raised up by means of the cam 59, which is fastened to the pan 15 at one side of the wheel 20, and which engages with the cam rollers 60 which are secured with the side walls 56 of the pockets 33.

The food to be cooked, such as potatoes, is dropped into the hopper 14 through the top of the cabinet 6. The slicing disc 39 then cuts off the slices which will drop into the inner end 17 of the channel. The slices are forced out from under the disc by the surges of oil flowing from the end of the trough 53. The cooking oil carries the slices along with it and moves step by step along through the spiral channel 16 because the oil and all the material contained in it is taken out of the channel at the outer end. The cooked chips are caught in the scoops 33, and the oil is directed back again at the starting point 17.

The wheel 20 rotates against the current of oil so that the ledges 54 lift the chips up out from underneath to avoid breaking them up.

As may be seen from Fig. 4, one oil pocket 46 is lifting oil out of the channel at about the same time that the opening of a hinged pocket 33 is emerging from the surface of the oil. This causes the oil in the channel to be moving towards the wheel when the pockets 33 are opening up. The perforated end of ledge 54 is in position to cover the outer end pockets 45 and prevent any of the chips from entering the oil pockets 46. The paddle 32, in turning, dips into the oil and periodically interrupts its flow and also assists in getting the chips caught on the ledges 54. This causes a step by step movement of oil throughout the channel to prevent eddies and it also prevents oil from flowing off the top or from drawing out from underneath the chips.

The pockets 33 are raised to insure the chips being disengaged from the surface of the ledges. The chips, when the pockets are inverted, drop down onto the inclined surfaces 55 and are directed away from the edge of the wheel. They fall into the chute 61 and drop down into the box 62 which is located on the outside of the machine. The bottom 63, of 62, is hinged so that the chips may be dropped out into a receptacle and carried away without being handled.

This construction described, permits of a shorter length of channel because the oil is well controlled therein and its movement may therefore be slower. The construction and arrangement of the parts are such that the parts may be assembled in units, fastened into place, and set into the frame work as pointed out above, the material to be cooked is preheated and also the odor from the machine is carried out through the ventilating flue 12.

Having thus described our invention, our claims are:

1. In a frying machine, a non-endless channel for hot-oil or cooking-fats, a rotating vertical wheel having marginal pockets adapted to dip into the oil at the lower part of the wheel to lift the oil out of the channel and adapted to empty the oil when rotated to the upper portions of the wheel, and said wheel having means for removing cooked material from the oil, and means for returning the oil emptied from the wheel back into the channel.

2. In combination in a frying machine, a cooking oil receptacle divided into a spiral shaped channel, a wheel located at one end of the channel and having pockets adapted to dip into the oil in the channel, a trough located above the channels and sloping from the wheel to the opposite end of the channel, said pockets being adapted to lift oil from the channel and pour the same into the said trough.

3. In combination of a frying machine, a cooking oil receptacle divided into a spiral shaped channel, means for depositing material to be fried into the oil at one end of the channel, a vertical rotating wheel partially submerged in the cooking oil at the opposite end of the channel, pockets in the wheel for lifting and pouring the oil out of the channel, means for receiving the oil from the wheel and returning the oil to the opposite end of the channel, and means in the wheel for catching said material and separating the same from the oil.

4. In combination in a frying machine having a circulating liquid cooking medium, a wheel rotating in vertical plane having hinged perforated scoops adapted to dip into the liquid and catch the material being cooked in the oil and means for raising the scoops when they are out of the liquid to empty the material, and means for receiving the material from said scoops when raised.

5. In a frying machine, means for circulating a stream of cooking oil, means for depositing potato-chips in the oil, a vertical wheel dipping into the stream and rotating against the stream, peripheral ledges in the wheel for catching and lifting the potato-chips out of the stream, and adapted to dump the chips out of the machine.

6. The combination claimed in claim 5, further characterized by inclined surfaces in the wheel adjacent the ledges adapted to receive the material from the ledges when inverted and to direct the material away from the wheel.

7. In combination in a frying machine, means for establishing a stream of cooking oil in which material to be cooked may be floated, a vertical wheel partially submerged in the oil, yieldingly held hinged members in the periphery of the wheel having ledges and outwardly inclined surfaces cooperating with said ledges, and means for raising the hinged members.

8. In a frying machine, a cooking vessel divided into a spiral shaped channel having an inner and an outer end, a vented enclosure above and surrounding the cooking vessel, a horizontal shaft extending from above the outer end of the channel to a point above the inner end of the channel, a wheel mounted on a horizontal shaft and dipping into the outer end of the channel, having pockets adapted to carry oil out of the channel and having members hinged in the periphery having ledged and inclined surfaces and yieldingly held adjacent the wheel, means for raising the said hinged members for dumping, a trough above the channels adapted to receive oil from the wheel and direct the same to the inner end of the channel, a rotating paddle mounted to co-act with the said hinged pockets and dipping into the oil, a horizontal slicer disc geared to the inner end of the said horizontal shaft and located above the inner end of the channel, a hopper supported above the slicer disc contained within the said enclosure and opening through the same, means for heating the cooking vessel, and means for driving the horizontal shaft and the rotating paddle.

9. In a cooking machine, a channel for hot oil or cooking fats, a wheel mounted to rotate in a vertical plane and partially submerged in the oil, said wheel having marginal pockets for dipping into the oil and lifting the oil out of the channel, and said wheel having means for removing the cooked material from the oil, and means for returning the oil in the wheel to a remote portion of the channel.

10. In a frying machine, a cooking oil receptacle, a vertical wheel rotatably mounted in one end of the receptacle, a trough extending from the wheel to the opposite end of the receptacle, said wheel having pockets adapted to lift the oil out of the receptacle and pour the same into the trough.

11. The combination in a cooking machine for frying loose particles of food in deep oil, of a vessel for holding the oil, a rotatable wheel having pockets for catching the loose particles of food in the oil, and a paddle co-operating with the wheel to register with the pockets to move the food into the pockets.

12. The combination in a cooking machine, of a vessel for holding the cooking oil, a wheel having pockets for catching the material in the oil, and a paddle co-operating with the wheel to move the material into the pockets.

13. The combination in a cooking machine, of a vessel for holding the cooking fluid, a wheel partially immersed in the fluid in the vessel, said wheel having pockets or ledges for catching the material in the fluid, and a rotatably mounted paddle co-operating with the wheel to lift the material into the pockets or ledges.

14. The combination in a cooking machine, of a vessel for holding cooking fluid, a wheel for removing material from the fluid, said wheel rotatably mounted on the vessel so that its edge dips into the fluid, and a paddle rotatably mounted on the vessel in co-operative relation with the wheel.

15. The combination in a cooking machine, of a vessel for cooking fluid, a wheel rotatably mounted on the vessel to dip into the fluid, said wheel having a peripheral pocket, and a paddle rotatably mounted on the vessel to register with the pocket to remove material from the fluid.

In testimony whereof we affix our signatures.

EMIL A. DENZ.
JOHN E. TITUS.